Aug. 3, 1965 H. F. MARTIN 3,198,980
LIGHT-SENSITIVE GLOW DISCHARGE APPARATUS
Filed Sept. 27, 1957 5 Sheets-Sheet 1

INVENTOR.
HAROLD F. MARTIN
BY Lippincott, Smith & Ralls
ATTORNEYS

LIGHT-SENSITIVE GLOW DISCHARGE APPARATUS

Filed Sept. 27, 1957 5 Sheets-Sheet 2

INVENTOR.
HAROLD F. MARTIN
BY Lippincott, Smith & Ralls
ATTORNEYS

Aug. 3, 1965 H. F. MARTIN 3,198,980

LIGHT-SENSITIVE GLOW DISCHARGE APPARATUS

Filed Sept. 27, 1957 5 Sheets-Sheet 3

INVENTOR.
HAROLD F. MARTIN
BY Lippincott, Smith & Ralls
ATTORNEYS

Aug. 3, 1965 H. F. MARTIN 3,198,980

LIGHT-SENSITIVE GLOW DISCHARGE APPARATUS

Filed Sept. 27, 1957 5 Sheets-Sheet 4

INVENTOR.
HAROLD F. MARTIN
BY Lippincott, Smith & Ralls
ATTORNEYS

LIGHT-SENSITIVE GLOW DISCHARGE APPARATUS

Filed Sept. 27, 1957 5 Sheets-Sheet 5

INVENTOR.
HAROLD F. MARTIN
BY Lippincott, Smith & Ralls
ATTORNEYS 3,198,980

LIGHT-SENSITIVE GLOW DISCHARGE APPARATUS

Harold F. Martin, San Jose, Calif., assignor to International Business Machines Corporation, New York, N.Y., a corporation of New York Filed Sept. 27, 1957, Ser. No. 686,699
12 Claims. (Cl. 315—84.5)

This invention relates to a new method for operating a glow discharge device as a light-sensitive circuit element, and to novel apparatus incorporating glow discharge devices so operated.

It has previously been observed that the glow discharge striking and sustaining voltages of cold-cathode, gas-filled diodes (such as small neon lamps) are variable to some extent as a function of the amount of light incident on the diode. However, other and greater variations in these voltages from one diode to another, and from one operation to another of the same diode, have prevented the useful application of this effect to provide a reliable light-sensitive circuit element.

According to certain aspects of this invention, a glow discharge device (usually a cold-cathode, gas-filled diode) can be operated as a low-cost, yet reliable, light-sensitive circuit element, by applying to the extinguished glow discharge device a pulse of voltage exceeding the glow discharge striking voltage but of a duration insufficient to strike a glow discharge in the absence of light. For example, using a common type of one-quarter watt neon glow lamp having a nominal glow discharge striking voltage of eighty-five volts, it has been found that an applied pulse of one hundred volts must have a duration exceeding about fifty microseconds to strike a glow discharge in the absence of light incident upon the neon lamp. In the presence of adequate light, a one hundred volt pulse having a duration exceeding about three microseconds will strike a glow discharge in the same neon lamp.

This effect has been found to be quite stable and similar from one glow lamp to another of the same type and from one operation to another of the same lamp. Whenever a glow discharge is struck in the lamp a pulse of substantial current flows through the lamp and thus the lamp transmits the pulse supplied to it. If no glow discharge is struck the lamp is substantially non-conductive to applied pulses. (Relatively small currents may flow through the unstruck diodes, which for practical purposes are negligible.) Therefore, such a lamp is a reliable, low-cost, light-sensitive circuit element when it is operated by applying to it pulses of voltage exceeding the glow discharge striking voltage, but of a duration insufficient to strike a glow discharge in the absence of incident light.

When a gas-filled diode is operated as a light-sensitive circuit element in the manner herein described, as a general rule the voltage applied across the diode between pulses can have any value smaller in magnitude than the glow discharge sustaining voltage of the diode. If the voltage between pulses is of the same polarity as the voltage pulses then the loss in pulse amplitude through the diode is small when the diode is adequately illuminated by incident light. Thus, large-amplitude pulses can be obtained with driving pulses of moderately larger amplitude. On the other hand, the pulse separation must be adequate for deionization of the gas in the diode between pulses. By applying across the diode between pulses a voltage of opposite polarity to the pulses, it has been found that the deionization time, and therefore the minimum pulse separation, can be reduced greatly—for example, from about fifty milliseconds to about six milliseconds. In some instances the magnitude of the reverse-polarity voltage may even exceed the nominal glow discharge sustaining voltage of the lamp.

As herein used, the term "glow-discharge striking voltage" means that voltage, the exceeding of which for a sufficient length of time, will result in the striking of a glow discharge. The term "glow discharge sustaining voltage" refers to that voltage, the falling short of which for a sufficient length of time, will result in the extinction of the glow-discharge.

The time interval between the application across a diode of sufficient voltage to strike a glow discharge and the actual striking of the glow discharge is commonly called the ionization time of the diode, even though some ions may exist in the diode prior to the striking of the discharge. The minimum length of time that the voltage across the diode must be kept smaller than the glow discharge sustaining voltage (or made of reverse polarity) in order to extinguish and prevent spontaneous restriking of the glow discharge is commonly called the deionization time, even though some ions may remain in the diode after the expiration of such time. The ionization time and the deionization time of a particular diode may vary with changes in operating conditions. Where used herein, the terms "ionization time" and "deionization time" have the above meanings.

The new method herein disclosed for operating a glow discharge device as a light-sensitive circuit element is useful in countless circuits for various purposes, including light-sensitive relay circuits, electro-optical servo-mechanisms, and many other applications that will occur readily to those skilled in the art.

According to certain other aspects of this invention, novel electrical gate circuits and novel stored-information read-out circuits are provided that incorporate glow-discharge devices operated as light-sensitive circuit elements according to the method disclosed in this specification.

A novel electrical gate circuit is provided by placing one or more electric lamps, herein called control lamps, adjacent to a gas-filled diode that is operated as a light-sensitive circuit element according to the method herein disclosed. For example, each of the control lamps, as well as the light-sensitive diode, may be a conventional one-quarter watt neon lamp. Control circuits are provided for selectively illuminating and extinguishing each of the control lamps. Whenever any one of the control lamps is lit the light-sensitive diode is illuminated. Consequently, the light-sensitive diode transmits electric pulses when, and only when, at least one of the adjacent control lamps is lit by its control circuit.

A simple gate circuit may comprise only one light-sensitive diode and one control lamp. Where a single light-sensitive diode is controlled by the lighting of any one of several control lamps, a logical "or" gate electrical circuit is provided. If two light-sensitive diode circuits are connected in tandem, with separate control lamps for each, a logical "and" gate electrical circuit is provided.

By connecting a plurality of the light-sensitive diodes in a suitable matrix, a read-out device is provided for translating into electric signals the information that is visibly stored on various information-storage media, such as punched or printed cards, and in self-luminous storage matrices, such as glow discharge and cathode-ray information-storage devices.

Considered from another viewpoint, the light-sensitive diodes under consideration act as light-controlled variable delay elements. For example, assume that a pulse of voltage exceeding the glow discharge striking voltage is suddenly applied across a small neon lamp in series with a resistor. If the applied voltage pulse has a duration exceeding about 50 microseconds a glow discharge will be struck in the lamp regardless of the presence or absence of light entering the lamp from external source.

As soon as a glow discharge is struck a voltage pulse appears across the series resistor.

Thus, in this mode of operation each input pulse supplied across the lamp and resistor in series always produces an output pulse across the series resistor, but there is a time delay between the beginning of the input pulse and the beginning of the output pulse, which is approximately equal to the ionization time of the lamp. This varies as a function of the light entering the lamp. Typical values are about 3 microseconds with full illumination to about 50 microseconds with no illumination. In other words, when the lamp is strongly illuminated by light from an external source, the output pulse will begin within about 3 microseconds of the beginning of the input pulse, whereas, in the absence of light there will be a delay of about 50 microsceonds between the beginning of the input pulse and the beginning of the output pulse.

The presence or absence of light entering the diode can be determined by establishing a short time interval (between 3 and 50 microseconds, for example) following the beginning of the input pulse, and then determining whether or not the output pulse begins within this time interval. It is evident that the delay principle herein disclosed can also be used for many other purposes.

A novel binary memory unit is provided by placing two of the light-sensitive diodes side-by-side so that a luminous glow discharge in one supplies light into the other. Pulses of voltage exceeding the glow discharge striking voltage are applied across the two diodes alternately in rapid succession. Each such pulse has a duration sufficient to strike a glow discharge in the diode to which it is applied if that diode was illuminated by an immediately preceding glow discharge in the other diode, but insufficient to strike such a glow discharge in the absence of light. These pulses alone are insufficient to initiate a glow discharge in either diode but once a glow discharge has been formed in either diode the applied pulses will maintain a continuous series of glow discharges in the two diodes alternately.

Thus, a two-state circuit is provided, having a first stable operating state wherein no glow discharges occur in the two diodes, and having a second stable operating state wherein glow discharges occur in the two diodes alternately. The circuit can be switched from the first state to the second state by any means capable of initiating a glow discharge in either diode, such as another pulse of voltage having a sufficient amplitude and duration. The two-state circuit can be switched from the second state back to the first state by interrupting the current through the two diodes for a time sufficient for the diodes to deionize.

The foregoing and other aspects of this invention may be better understood from the following illustrative description and the accompanying drawings. The scope of the invention is defined by the appended claims. In the drawings:

Figure 1:
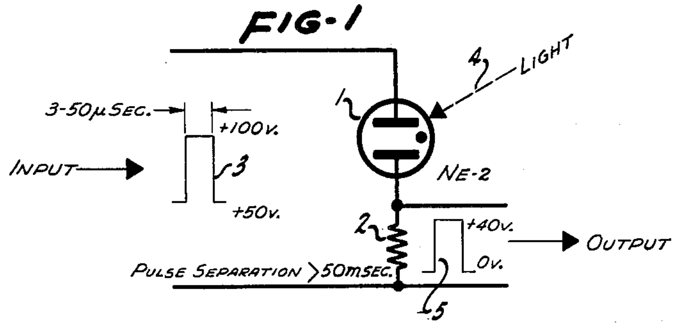
FIG. 1 is a schematic diagram illustrating a method for operating a glow discharge diode as a light-sensitive circuit element.

Referring to FIG. 1 of the drawings, a cold-cathode, gas-filled diode 1 is to be operated as a light-sensitive circuit element. By way of example, diode 1 may be an NE–2 neon lamp. As usually constructed, these neon lamps comprise a transparent glass bulb filled at low pressure with neon gas containing argon in the amount of about eight-tenths of one percent. Within the neon-filled bulb there are two nickel electrodes, coated with a mixture of barium oxide and strontium oxide, forming a cold-cathode diode. Such lamps have a nominal glow discharge striking voltage of about eighty-five volts, and a nominal glow discharge sustaining voltage of about sixty volts. Lamps that do not contain a considerable amount of raidoactive matter are preferred.

Diode 1 may be connected in series with an electrical load such as a resistor 2, which limits the maximum current that can flow through the diode and provides a convenient means to develop an output voltage. For operating the diode as a light-sensitive circuit element, pulses of voltage exceeding the glow discharge striking voltage of diode 1 are applied across diode 1 and resistor 2 in series. For example, such an input pulse 3 may have a peak voltage of about one-hundred volts, which is about fifteen volts greater than the nominal glow discharge striking voltage of diode 1, and may have a positive polarity at the upper terminal of the diode. With a symmetrical diode, all polarities may be reversed without affecting the operation, since either electrode can be a cathode.

Between input pulses the voltage across diode 1 and resistor 2 in series is made less than the glow discharge sustaining voltage of diode 1 (is made about fifty volts positive, for example) and the input pulses are separated by time intervals longer than the deionization time of diode 1 (greater than fifty milliseconds, for example) so that diode 1 is always extinguished, or substantially deionized and non-conductive, at the instant of arrival of each input pulse. Consequently, diode 1 is substantially non-conductive at the instant when each input pulse arrives and substantially the entire voltage drop of one hundred volts (the peak voltage of the pulse) occurs initially across the extinguished glow discharge diode.

According to this invention the time required to strike a glow discharge in the diode (the ionization time) varies as a function of the light incident upon the diode. For example, when one hundred volt pulses are applied across an NE–2 neon lamp in the absence of incident light, the pulse must have a duration exceeding about fifty microseconds in order to strike a glow discharge in the lamp. On the other hand, when the lamp is adequately illuminated, as is indicated in the drawings by a beam of incident light 4, which passes through the glass bulb into the interelectrode space of the diode, a one hundred volt pulse having a duration exceeding about three microseconds will strike a glow discharge in the lamp. Consequently, by making each of the input pulses 3 have a duration within the range of about three to fifty microseconds, each input pulse will strike a glow discharge in diode 1 if the diode is adequately illuminated by incident light, and will fail to strike a glow discharge in the absence of adequate incident light.

Until a glow discharge is struck in diode 1, the diode remains substantially non-conductive and there is no appreciable voltage drop across resistor 2. As soon as a glow discharge is struck in diode 1 the voltage drop across the diode falls approximately to the sustaining voltage of the diode, or about sixty volts, and the approximately forty volt difference between the glow-discharge sustaining voltage of the diode and the peak voltage of the input pulse appears across resistor 2. Thus, upon the application of each input pulse (of the amplitude and duration disclosed herein) across diode 1 and resistor 2 in series, an output pulse 5 of substantial voltage is produced across resistor 2 if diode 1 is adequately illuminated by incident light, but is not produced if diode 1 is not illuminated. Therefore, when operated in this manner, glow-discharge diode 1 becomes a reliable, light-sensitive circuit element.

An understanding of why glow discharge diodes are light-sensitive, as herein described, is not required to practice this invention. Several physical processes may be involved: excitation of atoms of the gas to higher energy levels; photoemission of electrons from the electrode surfaces; and possibly others. Probably the photoemission of electrons at the more negative electrode (cathode) is most significant. Therefore, it appears that the illumination, to be most effective, should be directed through the interelectrode space onto the surface of the cathode. In actual practice, no focusing of the light is required: light directed into the bulb illuminates substantially the whole interior of the light-sensitive diode. In the case of small neon glow lamps (NE–2 lamps in particular) used as light-sensitive diodes, an identical neon glow lamp placed beside the light-sensitive diode is a fully adequate source of illumination.

Between the input pulses applied to the diode, any voltage that is smaller in magnitude than the glow discharge sustaining voltage may be applied across the diode. For example, as illustrated in FIG. 1, a voltage of the same polarity as the input pulses may be applied across the diodes between pulses. In other words, pulses having peak voltage of one hundred volts may be obtained by superimposing pulses of fifty volts amplitude upon a fifty volt bias of the same polarity, to reduce the input pulse amplitude and power requirements. In this case, the output pulse 5, when diode 1 is adequately illuminated, has an amplitude almost as large as that of input pulse 3. Consequently, a bias voltage of the same polarity as the input pulses makes it possible for pulses to be transmitted through diode 1 with little loss of amplitude when the diode is illuminated.

Figure 2:
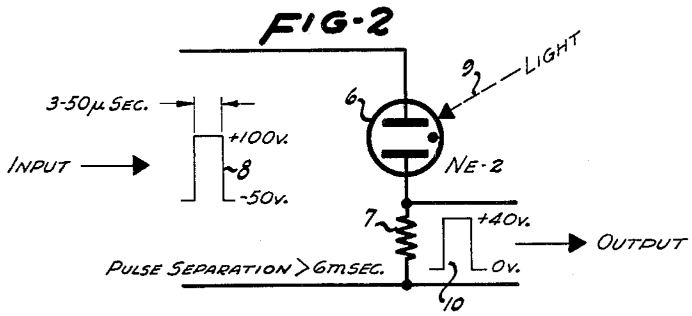
FIG. 2 is a schematic diagram illustrating another method for operating a glow discharge diode as a light-sensitive circuit element.

On the other hand, it is sometimes advantageous to apply across the diode a bias voltage of the opposite polarity to the input pulses. Referring to FIG. 2, an NE–2 neon lamp 6 is connected in series with a load resistor 7, and input pulses 8 are applied across the lamp and resistor in series. In this case, as in FIG. 1, the peak voltage of the input pulses is one hundred volts, and the input pulse duration is between about three and fifty microseconds. Consequently, diode 6 is operated as a light-sensitive circuit element in essentially the same manner as diode 1. Thus, whenever diode 6 is illuminated by incident light 9 an output pulse 10 of about forty volts amplitude is produced across resistor 7.

However, in the case illustrated in FIG. 2, the input pulse 8 is superimposed on a fifty volt bias of the opposite polarity, and therefore the input pulse must have an amplitude of about one hundred fifty volts. Consequently, even when diode 6 is adequately illuminated, there is a substantial reduction in the pulse amplitude during its transmission through the diode. But, a significant advantage is obtained with the reverse-polarity bias voltage, in that the deionization time of the glow discharge diode is reduced from about fifty milliseconds to about six milliseconds. Consequently, when utilizing the method of operation represented by FIG. 2 the separation of the input pulses may be reduced to time intervals approaching six milliseconds, whereas with the method represented by FIG. 1, the pulse separation of the input pulses must exceed about fifty milliseconds, under the conditions described using NE–2 lamps. In the example just given, the magnitude of the reverse polarity voltage is smaller than the nominal glow discharge sustaining voltage of the lamp. Reverse-polarity voltage pulses of larger magnitude (even larger than the nominal glow discharge striking voltage) may be used to deionize the diode, provided the reverse-polarity pulse amplitude and pulse duration, in combination, are insufficient to strike a discharge of current flowing in the reverse direction.

It is, of course, possible to combine the methods represented in FIGS. 1 and 2, by applying across the diode at different times during the interval between input pulses, voltages of different values. For example, immediately preceding each positive input pulse a positive voltage may be applied across the diode to reduce the required amplitude of the input pulse, in accordance with the method represented in FIG. 1 and immediately following each input pulse, a negative pulse may be applied across the diode for quickly deionizing the gas within the diode. After deionization it is even possible to apply a voltage larger than the nominal glow discharge sustaining voltage, but smaller than the striking voltage of either polarity, across the diode without striking an undesired discharge therein. It is also possible to make the voltage between pulses substantially zero and thus to eliminate bias voltage supplied.

Figure 3:
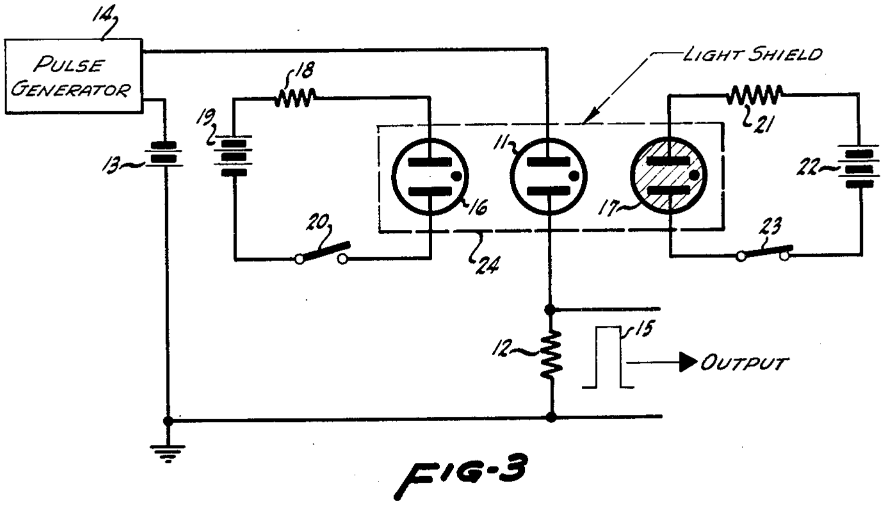
FIG. 3 is a simplified circuit diagram of an "or" gate electrical circuit.

Reference is now made to FIG. 3 of the drawings which illustrates a novel "or" gate electrical circuit incorporating a glow-discharge diode operated as a light-sensitive circuit element. The diode 11, which may be a conventional one-quarter watt neon lamp (type NE–2 for example) is connected in series with a load resistor 12. For example, diode 11 may have a nominal glow-discharge striking voltage of eighty-five volts, and a nominal glow discharge sustaining voltage of sixty volts. A bias voltage of about fifty volts, of negative polarity at the upper terminal of the diode is applied across diode 11 and resistor 12 in series, by any suitable voltage supply 13. The bias voltage is usually smaller than the nominal glow discharge sustaining voltage of the diode, to insure deionization of the diode between input pulses. A pulse generator 14 periodically supplies positive-going pulses, of about one hundred fifty volts amplitude, that are superimposed upon the fifty volt negative bias supplied by voltage supply 13. Consequently, each of the pulses supplied by pulse generator 14 has a peak positive voltage of about one hundred volts, which exceeds the glow discharge striking voltage of diode 11.

The pulses supplied by pulse generator 14 each have a duration between about three and fifty microseconds, and the pulses are separated from one another by more than the deionization time (with reverse-polarity bias) of about six milliseconds. Consequently, according to the principles herein explained, glow discharge diode 11 is operated as a light-sensitive circuit element. Upon the occurrence of each input pulse supplied across diode 11 and resistor 12 in series by pulse generator 14, an output pulse 15 of substantial voltage occurs across resistor 12 only if diode 11 is adequately illuminated by incident light.

A plurality of electric lamps 16 and 17, herein called control lamps, are disposed beside diode 11, as shown, so that diode 11 is illuminated by incident light whenever any one of the control lamps is lit. Each of the control lamps 16 and 17 may advantageously be a small neon lamp identical to diode 11.

Each of the control lamps is provided with a control circuit for selectively lighting and extinguishing that lamp. For example, lamp 16 may be connected in series with a resistor 18, a voltage supply 19, and a switch 20, so that lamp 16 is lit whenever switch 20 is closed, and lamp 16 is extinguished whenever switch 20 is open. As illustrated, switch 20 is open and lamp 16 is extinguished. Lamp 17 may be connected in series with a resistor 21, a voltage supply 22 and a switch 23 so that lamp 17 is lit whenever switch 23 is closed, and lamp 17 is extinguished whenever switch 23 is open. As illustrated, switch 23 is closed and lamp 17 is lit. The lit condition of a lamp is represented in the drawing by diagonal hatching in a conventional manner. To prevent the illumination of diode 11 by any means other than control lamps 16 and 17, there may be provided a light shield 24 surrounding diode 11 and lamps 16 and 17 with a common opaque enclosure.

Whenever either of the switches 20 and 23 is closed, at least one of the control lamps 16 and 17 is lit, and diode 11 is adequately illuminated, so that each pulse of voltage provided by pulse generator 14 strikes a glow discharge in diode 11 and produces an output pulse 15 of substantial voltage across resistor 12. Whenever both of the switches 20 and 23 are open, neither of the lamps 16 and 17 is lit, there is no light incident upon diode 11, and diode 11 remains substantially non-conductive throughout each pulse supplied by pulse generator 14. Consequently, under these last-mentioned conditions no substantial output pulse is produced across resistor 12. Thus, an "or" gate is provided which transmits electric pulses from pulse generator 14 to the output circuit whenever either switch 20 or switch 23 is closed.

As is well known, "or" gate electrical circuits have many uses as logical circuit elements in computing, data processing and other apparatus. The present "or" gates are especially advantageous in their simplicity, low cost, and versality. It is evident that a considerable number of electric lamps may be positioned for illuminating diode 11 and that each of these lamps can be controlled by a separate control circuit so that, with remarkably simple apparatus, a many-input "or" gate can be constructed. Furthermore, the control circuits are electrically isolated from one another, and from the pulses supplied by pulse generator 14.

If only one control lamp and control circuit is provided, the FIG. 3 circuit becomes a simple gate that selectively transmits and blocks pulses from generator 14, or is selectively "opened" and "closed," under exclusive control of the single control circuit. Simple gates also have many well-known uses and applications.

Figure 4:
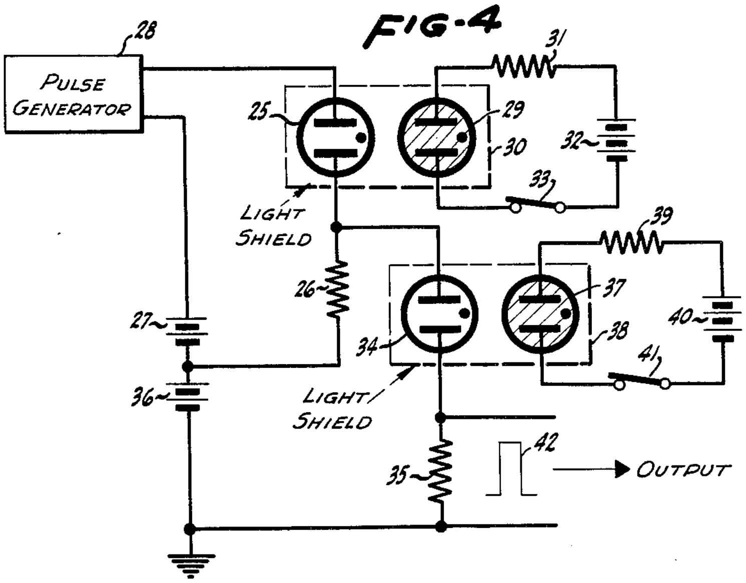
FIG. 4 is a simplified circuit diagram of an "and" gate electrical circuit.

FIG. 4 illustrates a novel "and" gate electrical circuit incorporating glow discharge diodes operated as light-sensitive circuit elements. A glow discharge diode 25, which may be a conventional one-quarter watt neon lamp having the approximate characteristics hereinbefore described, is connected in series with a load resistor 26. A voltage supply 27 provides, across diode 25 and resistor 26 in series, a positive bias voltage (fifty volts, for example) smaller than the glow-discharge sustaining voltage of diode 25. A pulse generator 28 supplies positive-going pulses of about sixty volts amplitude superimposed upon the bias voltage supplied by voltage supply 27 so that the peak positive voltage of each pulse (about one hundred ten volts, for example) exceeds the striking voltage of diode 25. Each pulse supplied by pulse generator 28 has a duration between about six and fifty microseconds, and is separated from other like pulses by time intervals greater than the deionization time of the diode, about fifty milliseconds, so that diode 25 is operated as a light-sensitive circuit element in the manner herein explained.

An electric lamp 29, herein called a control lamp, is positioned to illuminate diode 25. Lamp 29 may advantageously be a small neon lamp of the same type as diode 25. A light shield 30 is provided to prevent the illumination of diode 25 by any means other than lamp 29. A control circuit is provided for selectively lighting and extinguishing lamp 29. By way of example, lamp 29 may be connected in series with a resistor 31, a voltage supply 32, and a switch 33 so that lamp 29 is lit whenever switch 33 is closed, and lamp 29 is extinguished whenever switch 33 is open. As illustrated, switch 33 is closed and lamp 29 is lit. While lamp 29 remains lit, each pulse of voltage supplied by pulse generator 28 strikes a glow discharge in diode 25 and a positive-going pulse of about fifty volts amplitude is provided across load resistor 26.

Another glow discharge diode 34 is connected in series with a load resistor 35. Diode 34 may be identical to diode 25. A voltage supply 36 provides a fifty volt positive bias across diode 34 and resistor 35 in series. Superimposed upon this bias are the positive-going pulses of voltage produced across resistor 26 by the striking of glow discharges in diode 25. Therefore, each pulse provided across resistor 26, by the striking of a glow discharge in diode 25, produces across diode 34 a peak voltage of about one hundred volts, which exceeds the nominal glow discharge striking voltage of diode 34. Since the durations of the pulses across resistor 26 are approximately the same as the durations of the pulses supplied by pulse generator 28, diode 34 also is operated as a light-sensitive circuit element in accordance with principles herein disclosed.

An electric lamp 37, herein called a control lamp, is positioned to illumindate diode 34. Lamp 37 may advantageously be a small neon lamp of the same type as diode 34. A light shield 38 encloses diode 34 and lamp 37 in a common opaque enclosure and prevents the illumination of diode 34 by any means other than the lighting of lamp 37. Lamp 37 is selectively lit and extinguished by a control circuit. By way of example, lamp 37 may be connected in series with a resistor 39, a voltage supply 40 and a switch 41 so that lamp 37 is lit whenever switch 41 is closed, and lamp 37 is extinguished whenever switch 41 is open. As illustrated, switch 41 is closed and lamp 37 is lit.

Whenever both of the two switches 33 and 41 are closed, both of the lamps 29 and 37 are lit, and both of the diodes 25 and 34 are illuminated by incident light. Under these conditions, each pulse of voltage supplied by pulse generator 28 strikes a glow discharge in both of the diodes 25 and 34, and an output pulse 42 of substantial voltage (about forty volts amplitude) appears across resistor 35. However, if either of the switches 33 and 41 is open, the lamp that it controls is extinguished and the associated light-sensitive diode is not illuminated. Whenever either of the two diodes 25 and 34 is not illuminated, a pulse of voltage from pulse generator 28 will not strike a glow discharge in that diode, and no substantial output pulse will be provided across resistor 35.

For example, assume that switch 33 is open and lamp 29 is extinguished. A pulse of voltage supplied by pulse generator 28 will not strike a glow discharge in diode 25, and therefore there will be no substantial pulse or voltage across resistor 26. In this case, the voltage across diode 34 will never exceed the striking voltage, and no glow discharge will be struck in either diode, regardless of the position of switch 41. On the other hand, if switch 33 is closed but switch 41 is open, a pulse of adequate voltage to strike a glow discharge will be applied to diode 34 but no glow discharge will be struck in diode 34 because that diode is not illuminated. Accordingly, output pulses are produced across resistor 35 only when both of the two switches 33 and 41 are closed. Thus, an "and" gate electrical circuit is provided which has numerous uses as a logical circuit in computing, data processing and other apparatus. It may be noted that there is a delay of about five microseconds between the beginning of an input pulse supplied by generator 28 and the beginning of an output pulse across resistor 35.

It is evident that the principles of the "or" gate, shown in FIG. 3, and the principles of the "and" gate, shown in FIG. 4, can be combined, if desired, to provide reasonably simple circuits capable of rather complex logical operations. If, for example, a plurality of electric lamps, each operated by its own control circuit, are placed beside diode 25 within light shield 30 (FIG. 4), then diode 25 becomes part of a first "or" circuit that will transmit an electric pulse to diode 34 whenever any one of its several control circuits is energized. Similarly, a plurality of individually controlled electric lamps may be provided beside diode 34 within light shield 38 so that diode 33 becomes part of a second "or" circuit connected in tandem with the first. An output pulse will be provided across resistor 35 whenever any control lamp is lit in the first "or" circuit and, concurrently, any control lamp is lit in the second "or" circuit. But if all of the control lamps are extinguished in either "or" circuit, then no output pulse will be provided.

It should be understood that the drawings are largely schematic and are intended to illustrate the principles involve in as simple a manner as is possible. In actual practice, the control circuits for selectively lighting and extinguishing the control lamps are likely to be more complicated than is represented in FIGS. 3 and 4. For example, the control lamps may be lit by electric pulses supplied thereto at appropriate times by electronic pulse generation and switching means, rather than by the opening and closing of mechanical switches. Or, the control circuits may be functionally related to or be parts of counting registers, or the like, in computing or data-processing equipment. In such cases moderately high-speed operation of the control circuits may be required, which may make the use of glow-discharge lamps as control lamps for lighting the light-sensitive diodes especially advantageous because short pulses of light can be provided by supplying short electric pulses to the glow lamps.

On the other hand, incandescent lamps may be used as control lamps where a short memory is required. Once the filament of an incandescent lamp has been heated by a sufficiently strong electric pulse, the filament can continue to emit light for a brief time after the termination of the pulse and thus will "remember" that a pulse has recently been applied to it. For as long as an incandescent control lamp continues to emit adequate light, a glow discharge can be struck in the light-sensitive diode that is illuminated by that control lamp.

Numerous other changes can be made in the circuit connections. For example, in FIG. 4 it is not essential that the two light-sensitive diodes 25 and 34 be connected directly together (although it does provide an advantageously simple circuit, which is often a very important consideration) since numerous means can be employed for transmitting output pulses from one light-sensitive diode to the next with or without pulse amplification between the two light-sensitive diodes. Because the light-sensitive diodes are operated pulse-wise rather than continuously, the load impedance in series with each diode is not necessarily a resistor but may, in some cases, be an inductor or other circuit element having a reactive or complex impedance, provided, however, that the impedance characteristic of the load, or the regulation of the input pulse source, or both, is such that destructive currents through the glow discharge diodes are prevented, and that oscillations are adequately damped to permit stable operation of the circuit in the desired manner.

Figure 5:
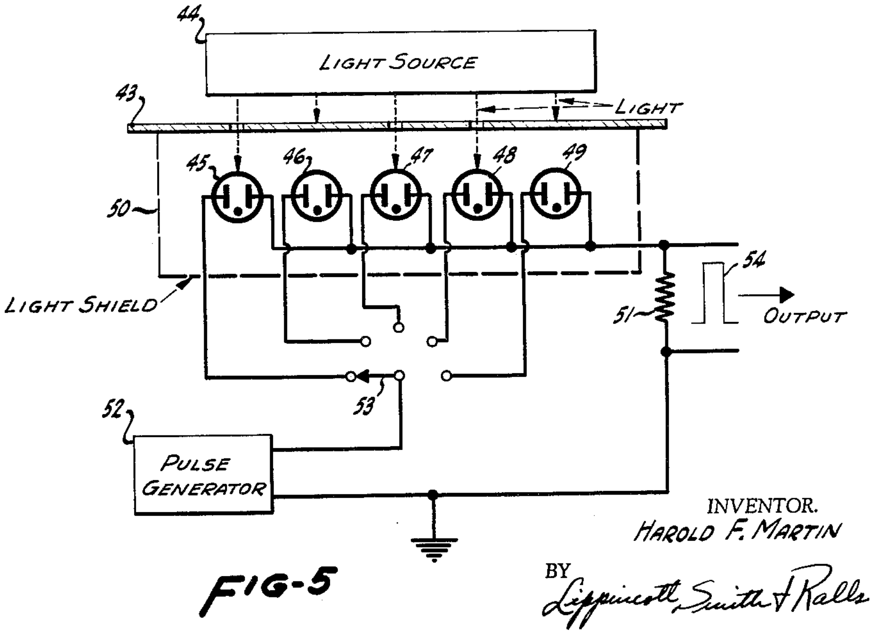
FIG. 5 is a schematic diagram of read-out apparatus for translating stored information from a punched card into electric signals.

Reference is now made to FIG. 5, which represents one type of read-out apparatus incorporating glow discharge devices operated as light-sensitive circuit elements for translating stored information into electric signals, which is commonly called "reading-out." An information storage medium, or record, may be a conventional punched card 43, having a plurality of information-storage areas in each of which a bit of binary information is represented by the presence or absence of a hole punched through the card. Combinations of holes and the absence of holes in respective storage areas can represent binary, decimal, alphabetical and other forms of information.

Card 43 is illuminated from one side by any suitable light source 44, so that light passes through the holes punched in the card and forms at the other side of the card a luminous display representative of the recorded information. A plurality of glow discharge diodes, identified in the drawing by reference numbers 45 through 49, are disposed in optical alinement with respective information-storage areas of card 43, so that those diodes alined with a storage area containing a punched hole are illuminated by light from source 44 passing through the hole punched in card 43, while diodes alined with areas of card 43 that contain no punched hole are not illuminated. The diodes may be enclosed by a light shield 50 so arranged that the diodes cannot be illuminated by any means other than light passing through holes punched in card 43. If desired, lenses, mirrors and other optical elements can be employed to project an image of card 43, with or without enlargement, onto the array of diodes 45 through 49.

By way of example, diodes 45 through 49 may be alined with one column of holes punched in card 43. Other diodes may be alined with other columns of holes punched in the card, if desired, to form a planar matrix of diodes. Such a matrix may contain any desired number of columns, and any desired number of diodes in each column, for reading-out information from cards of various sizes.

A resistor 51 is connected in series with all five of the glow discharge diodes 45 through 49, as shown. A pulse generator 52 and a stepping switch 53 are connected and operable to apply voltage pulses across resistor 51 in series with each of the five glow discharge diodes in succession. In other words, with switch 53 in the position shown, pulse generator 52 applies a pulse of voltage across diode 45 and resistor 51 in series. The contact of stepping switch 53 is then moved one step clockwise, and pulse generator 52 applies a voltage pulse across diode 46 and resistor 51 in series, etc. The voltage pulses supplied by pulse generator 52 exceed the striking voltage of each diode, and have durations sufficient to strike a glow discharge in each of the diodes that is illuminated by light passing through a hole punched in card 43 but insufficient to strike a glow discharge in any of the diodes that is not illuminated. Consequently, in each position of switch 53, an output pulse 54 of substantial voltage either appears or does not appear across resistor 51, selectively, depending upon whether or not there is a punched hole in card 43 at the corresponding information-storage position.

Thus, a sequence of voltage pulses is produced across resistor 51, which represents the information stored in a column of holes punched in card 43, and the stored information has been translated into sequential electric signals, or "read-out." The information stored in other columns of holes punched in card 43 can be translated into electric signals, or "read-out," by moving the card 43 relative to diodes 45 through 49, to bring each column of holes sequentially into alinement with the diodes. Alternatively, additional diodes can be provided for simultaneously translating into electric signals the information stored in a plurality of columns on card 43. In this case the diodes will be arranged in a matrix of rows and columns corresponding to the rows and columns of information-storage areas on card 43. Each column of diodes may be identical to the column of diodes 45 through 49 illustrated, and have its own output circuit, while a single pulse generator 52 and stepping switch 53 may be employed to apply voltage pulses across each diode in a row simultaneously, so that a parallel read-out is provided wherein all of the information stored in each row on card 43 is translated into electric signals simultaneously, while successive rows are translated sequentially. By interchanging rows and columns, as by rotating card 43 ninety degrees in a horizontal plane, all of the information stored in a column can be translated simultaneously, while successive rows are translated sequentially. Extremely fast read-outs are thus provided since all of the information stored on a card can be translated into electric signals without moving the card; or can be translated almost instantaneously while the card is in motion, since the entire read-out operation may be completed in less than one second. If even faster read-out is required more complex input-output circuits can be employed for translating both rows and columns simultaneously.

It is not necessary that the information be stored on card 43 by means of punched holes. For example, stored information may be represented by reflective and nonreflective areas printed on one surface of card 43, and an optical system may be arranged to illuminate those glow discharge diodes that are alined with the reflective areas of the card. As another alternative, the information might be printed upon card 43 with fluorescent ink that emits visible light when it is illuminated by ultraviolet light or the like. Filters may be employed so that only fluorescent areas on the card will illuminate the diodes. Thus, any storage medium on which recorded information is represented by areas that selectively send out light or fail to send out light, when illuminated or otherwise stimulated, can be employed.

A read-out matrix of the type herein described can, in principle, comprise a planar array of ordinary one-quarter watt neon lamps. However, such a matrix may be undesirably large and may necessitate the use of magnifying lenses, or the like to secure optical alinement between each diode and a respective information-storage area of a small punched card or the like. A more compact construction of a glow-discharge diode matrix is illustrated in FIG. 6.

Figure 6:
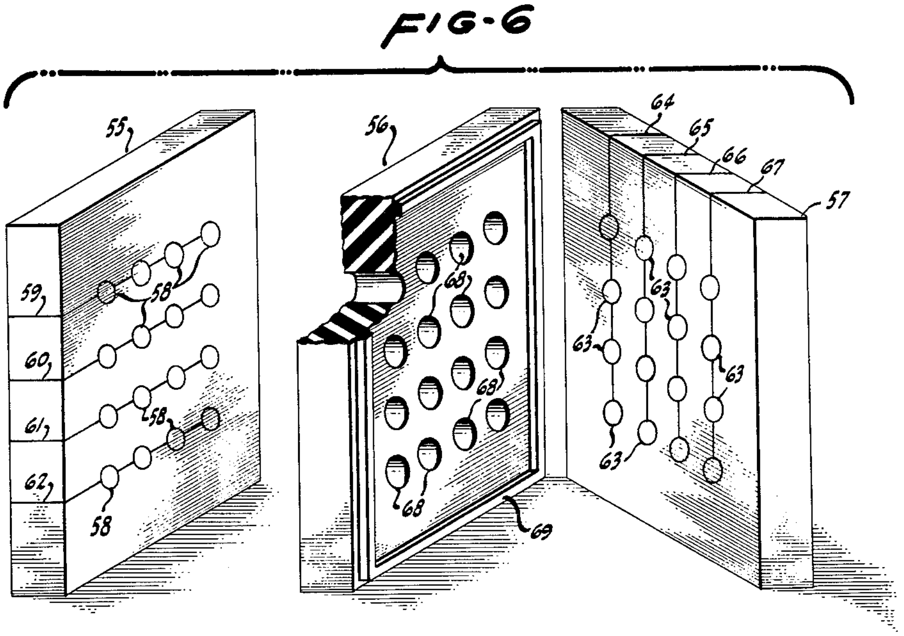
FIG. 6 is an exploded perspective view of a preferred construction for a read-out matrix.

FIG. 6 is a somewhat schematic, exploded view showing a preferred construction of a glow discharge diode matrix. The structure comprises three slabs of insulating material 55, 56 and 57, which are assembled parallel to one another and pressed together in a sandwich-like construction. Each of the three slabs is made of an electrically non-conductive material, such as glass. One outer slab 57 is substantially transparent, and the center slab 51 is substantially opaque. The other outer slab 55 may be either transparent or opaque, or of intermediate opacity. A plurality of annular or discoid metallic cathodes 58 are deposited on the inner surface of slab 55, and are connected together in rows by conductive metallic strips 59 through 62 deposited on slab 55, in the manner illustrated. On the inner surface of slab 57 there are deposited a plurality of annular anodes 63 which are connected together in columns by conductive strips 64 through 67, as shown. It will be noted that there is an anode on slab 57 opposite each cathode on slab 55, which combine to form a rectangular matrix of sixteen diodes disposed in four rows and four columns. Much larger matrices can be constructed if desired: a relatively small matrix is shown in the drawing for simplicity and clarity.

The center slab 56 contains a plurality of holes 68 extending between each of the cathodes 58 and corresponding ones of anodes 63. Also, slab 56 is formed with a peripheral ridge 69 on the side nearest slab 57, as shown, so that when the three slabs are assembled together, ridge 69 maintains a slight spacing between the remainder of slab 56 and slab 57, and all of the holes 68 are in fluid-communicating relation through the space between slabs 56 and 57. With the three slabs 55, 56 and 57 pressed together, the enclosed space including holes 68 is substantially evacuated and filled with a suitable gas at low pressure, such as neon plus a small amount of argon, to form a matrix of glow discharge diodes.

Any of the four rows of diodes can be selected for completing an electrical circuit by selecting one of the four conducting lines 59 through 62 deposited on slab 55, and any one of the four columns of diodes can be selected by selecting one of the four conductive lines 64 through 67 deposited on slab 57. Thus, by selecting one of the four lines 59 through 62 and one of the four lines 64 through 67, and applying a voltage between the two selected lines only, a glow discharge can be produced in any selected one of the sixteen diodes.

A glow discharge diode matrix of the type shown in FIG. 6 may be connected in a circuit like that shown in FIG. 5. A punched card or the like can be placed against the outer side of transparent slab 57, with the respective information-storage areas of the card in alinement with respective ones of anodes 63. The other side of the card is then illuminated by any suitable light source and wherever there is a hole punched in the card light passes through this hole and through the corresponding annular anode 63 into the interelectrode space of a diode. Thus, light passing through each punched hole in the card illuminates both the gas and the cathode of the glow discharge diode that is alined with that punched hole. Each diode that is not alined with a punched hole remains substantially unilluminated. The opaqueness of slab 56 prevents substantial cross-illumination between adjacent diodes.

Each of the lines 59 through 62 may be connected to circuit ground through a load resistor, and electric pulses may be supplied to each of the lines 64 through 67 by a pulse generator and stepping switch in the manner illustrated in FIG. 5. Thus, electric pulses are applied to each column of diodes in succession. As an electric pulse is applied to each of the columns of diodes a glow discharge is struck in each of the illuminated diodes in that column, and electric pulses are produced across the load resistors in each row that contains a diode in which a glow discharge is struck. Thus, all of the information recorded in each column on the punched card can be read out simultaneously, while the information recorded in successive columns is read out sequentially.

If lines 64 through 67 are connected to respective load resistors while pulses are applied sequentially to lines 59 through 62, the information stored in each row will be read out in parallel, while the information recorded in successive rows will be read out sequentially. Or, rows and columns can be interchanged simply by rotating the punched card by ninety degrees.

It is apparent that positive-going pulses should be used when the input pulses are supplied to the diode anodes, and that negative-going pulses should be used when the input pulses are supplied to the diode cathodes. In many cases the anode and cathode are identical electrodes and therefore are interchangeable, in which case the polarity of the applied pulses is immaterial unless a particular polarity is demanded by circuit elements other than the light-sensitive diodes.

In the construction shown in FIG. 6 the anodes are preferably made annular so that light can readily enter the interelectrode space of each diode. Alternatively, the anodes may be thin, light-permeable, discoid coatings. The cathodes may be identical to the anodes; or the cathodes may be made discoid, and not necessarily light-permeable, to provide as large a cathode surface as possible, thereby contributing to the stability of the glow discharge. If both the anode and the cathode are annular, or sufficiently thin, light can enter the interelectrode space from either the anode or the cathode side of the diode, which may be desirable in some cases.

Figure 7:
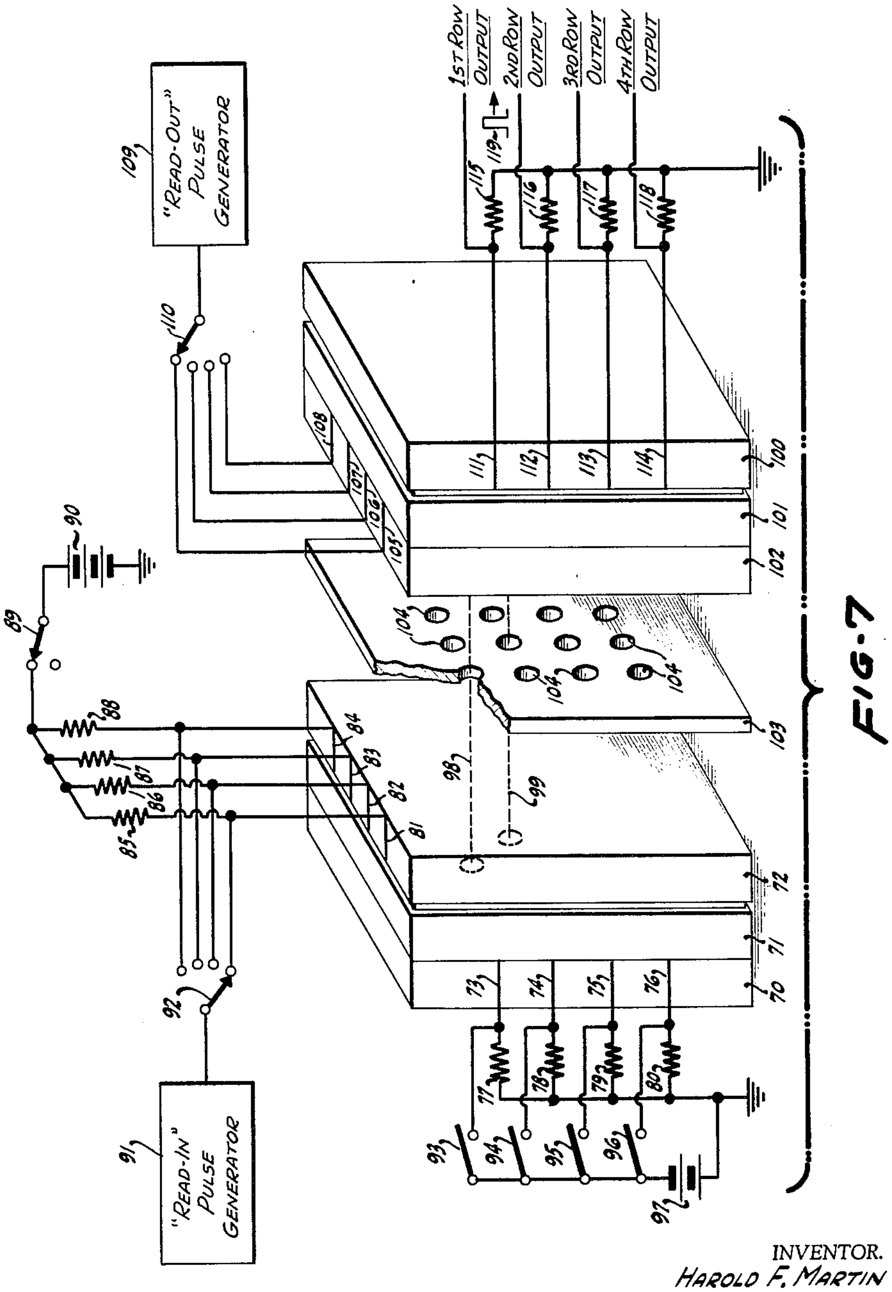
FIG. 7 is a somewhat schematic perspective view and circuit diagram of apparatus for translating stored information from a self-luminous storage matrix into electric signals.

Reference is now made to FIG. 7, which illustrates a useful combination of an information-storage matrix and a read-out matrix, each comprising a glow discharge structure like that illustrated in FIG. 6. The storage matrix comprises a sandwich-like assembly of three slabs 70, 71 and 72 which are identical to the slabs 55, 56 and 57, respectively, illustrated in FIG. 6. The three slabs 70, 71 and 72 form a matrix of sixteen glow discharge diodes, arranged in four rows and four columns as hereinbefore explained.

Four conductive lines, 73 through 76, each of which is connected to all of the cathodes in a respective row of diodes in the storage matrix, are connected to circuit ground or its equivalent through four load resistors 77 through 80, as shown. Four conductive lines, 81 through 84, each of which is connected to all of the anodes in a respective column of diodes in the storage matrix, are connected through four resistors, 85 through 88, respectively, and a switch 89, to a positive voltage supply 90. Voltage supply 90 provides a voltage larger than the glow discharge sustaining voltage, but smaller than the glow-discharge striking voltage, of each glow discharge diode. Therefore, in the particular circuit illustrated, once a glow discharge is struck in any of the sixteen diodes in the storage matrix, that glow discharge is maintained until switch 89 is opened, which breaks the circuits and extinguishes all of the glow discharges in the storage matrix.

A "read-in" pulse generator 91 and a selector switch 92 are connected to supply positive electric pulses to any selected one of the four lines 81 through 84. A plurality of switches 93 through 96 are operable to connect any selected one of the four lines 73 through 76 to a negative voltage supply 97. The amplitude of the pulses supplied by pulse generator 91 and the magnitude of the negative voltage supplied by supply 97 are each insufficient, without the other, to raise the voltage across any diode to the glow discharge striking voltage. However, when one of the switches 93 through 96 is closed to lower the cathode potential of a selected row of diodes to the negative potential supplied by voltage supply 97, and when selector switch 92 is appropriately positioned and pulse generator 91 is operated to apply a positive-going voltage pulse to the anodes of a selected column of diodes, the glow discharge striking voltage is exceeded across that one diode positioned at the intersection of the selected cathode row and the selected anode column. Also, the durations of the pulses supplied by generator 91 exceed the ionization time of the diodes, and a glow discharge is struck in the selected diode at the intersection of the selected row and the selected column. Thus, by repeated operations of pulse generator 91 while manipulating switches 92 through 96, a glow discharge can be struck in any selected diode in each column of the storage matrix.

Once a glow discharge is initiated in the storage matrix, it is maintained so long as switch 89 remains closed. Therefore, information can be stored in the matrix. Furthermore, the glow discharges in the selected diodes are self-lumious and can be seen through transparent slab 72. Therefore, a representation of the stored information is continuously visible. Light emanating from two glow discharges within the storage matrix is represented in the drawing by broken lines 98 and 99.

A non-destructive read-out of the stored information is provided by apparatus comprising a similar matrix of glow discharge diodes. The read-out matrix is formed in a sandwich-like structure of three slabs 100, 101 and 102 which may be identical to the three slabs 55, 56 and 57, respectively, illustrated in FIG. 6. Each of the diodes in the read-out matrix 100–102 is optically alined with a respective one of the diodes in storage matrix 70–72, so that a glow discharge existing in any diode of the storage matrix illuminates the corresponding diode in the read-out matrix.

To insure that each diode in the read-out matrix will be illuminated only by the directly opposite diode in the storage matrix, an opaque slab 103, containing a plurality of holes 104, is positioned between the two diode matrices with holes 104 in optical alinement with opposite diodes. In actual practice slab 72 of the storage matrix and slab 102 of the read-out matrix may be in contact with opposite sides of slab 103. A greater spacing is shown in drawing for clarity of illustration only. If greater optical isolation between unalined diodes is required, this is easily achieved by increasing the thickness of slab 103.

Each of the conductive lines 105 through 108 connects together all of the anodes in a respective column of diodes in the read-out matrix. A read-out pulse generator 109 and a switch 110 are provided for supplying positive-going electric pulses to each of the lines 105 through 108, sequentially. Each pulse supplied by pulse generator 109 has a positive peak value that exceeds the glow discharge striking voltage of the read-out matrix diodes, but has a duration that is insufficient to strike a glow discharge in any one of the diodes unless that diode is illuminated by incident light from a glow discharge existing in the corresponding diode of the storage matrix.

Each of the conductive lines 111 through 114 connects together all of the cathodes in a respective row of diodes in the read-out matrix. Lines 111 to 114 are connected to circuit ground through load resistors 115 through 118, respectively. Each time that a glow discharge is struck in any diode in the first (top) row of the read-out matrix, an output pulse 119 of substantial voltage is produced across resistor 115. Similarly, each time that a glow discharge is struck in any diode in the second row of the read-out matrix, an output pulse of substantial voltage is produced across resistor 116, etc.

Assume, for example, that information has been stored in the storage matrix, 70–72, by producing sustained glow discharges in two diodes of the storage matrix located at the intersections of the first row and the first column, and the second row and the second column, respectively. Light from these two glow discharges is represented in the drawing by broken lines 98 and 99. This light passes through the annular anodes and through transparent slab 72 of the storage matrix, through holes 104 in opaque slob 103, and through the transparent slab 102 and the annular anodes of the two opposite diodes in the read-out matrix. Consequently, light is incident upon the two diodes of the read-out matrix located at the intersections of the first column and the first row, and the second column and the second row, respectively.

Now assume that switch 110 is positioned to connect pulse generator 109 to line 105, which is connected to all of the anodes of diodes in the first column of the read-out matrix. Pulse generator 109 is now operated to supply line 105 with a pulse of voltage exceeding the glow discharge striking voltage of the diodes, and having a duration sufficient to strike a glow discharge in the illuminated diode but insufficient to strike a glow discharge in the diodes that are not illuminated. Consequently, a glow discharge is struck in that diode of the read-out matrix located at the intersection of the first row and the first column, which corresponds in position to a glow discharge in the first column of the storage matrix. As the glow discharge is struck in this diode, an output voltage pulse 119 is produced across resistor 115, which represents in electrical form the fact that a bit of information has been stored in the first row and first column of the storage matrix 70–72.

Next, the stepping switch 110 is moved to its next position for connecting pulse generator 109 to conductive line 106. Now the pulse generator is operated to supply a voltage pulse to all of the anodes of diodes in the second column of the read-out matrix, and a glow discharge is struck in the diode located at the intersection of the second row and the second column. This produces an output voltage pulse across resistor 116, which represents electrically the fact that a bit of information has been stored in the second row and the second column of the storage matrix 70–72.

It is evident that the read-out is non-destructive of the information stored in the storage matrix 70–72. Furthermore, the read-out can be accomplished rapidly and repeated as often as may be desired. It will be noted that the circuit arrangement shown provides parallel read-out of the information stored in each column, and serial read-out of the information stored in successive columns. Other circuit arrangements for producing various other combinations of parallel and serial read-outs will be obvious to those skilled in the art in the light of the principles disclosed in this specification.

It will be appreciated that the read-out matrix illustrated is not limited in its use to the particular type of storage matrix illustrated. In general, the read-out matrix illustrated can be used with any storage system wherein the stored information is or can be represented by selectively luminous and non-luminous areas. For example, the read-out matrix shown can be used with storage systems of the type in which information is stored, or even merely displayed, on the face of a cathode-ray tube or the like.

Figure 8:
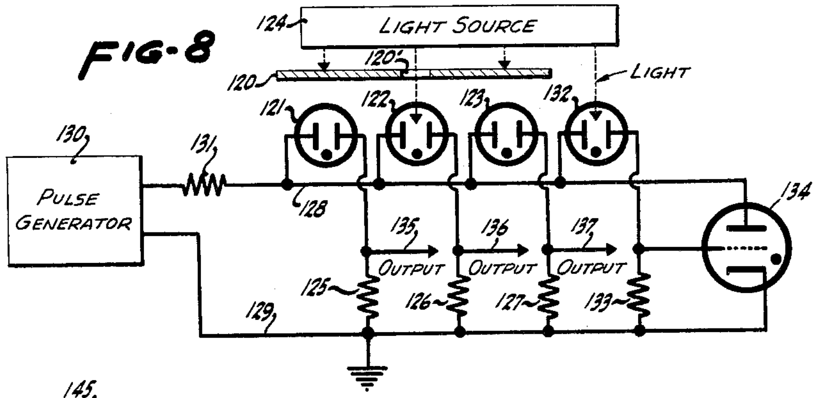
FIG. 8 is a schematic diagram of read-out apparatus including an additional light-sensitive diode for monitoring and controlling the durations of the input pulses.

Reference is now made to FIG. 8 of the drawings, which represents read-out apparatus for producing electric signals corresponding to holes punched in a record card 120, or the like. A plurality of gas-filled diodes, such as small neon lamps, are disposed below card 120 in alinement with various positions on the card where a hole may be punched or not, selectively, for representing stored information. Three such lamps, 121, 122 and 123, are illustrated, but it will be understood that any desired number of diodes may be provided. The other side of card 120 is illuminated by any suitable light source 124.

It will be noted from the drawings that a hole 120' has been punched in card 120 in optical alinement between light source 124 and diode 122, so that diode 122 is illuminated by light passing through hole 120' of the punched card. There are no holes in card 120 at the positions alined with diodes 121 and 123. Therefore, diodes 121 and 123 are not illuminated. Consequently, upon the application of equal voltage pulses across each of the diodes 121, 122 and 123, a glow discharge will be struck in diode 122 much more rapidly than in diodes 121 and 123. In fact, if the applied pulse is terminated before the striking of glow discharges in the unilluminated diodes, glow discharges will be struck in only those diodes that are alined with holes punched in card 120.

The three diodes 121, 122 and 123 are connected, in series with respective ones of three load resistors 125, 126 and 127, between two electrical conductors 128 and 129. Voltage pulses are supplied between conductors 128 and 129 by a pulse generator 130, which is preferably connected in series with a dropping resistor 131 to provide a high-impedance voltage source such that the voltage between conductors 128 and 129 drops considerably whenever a low-resistance connection is provided between the two conductors. The voltage pulses supplied by generator 130 exceed the glow discharge striking voltages of diodes 121 through 123, and preferably have durations (at the terminals of generator 130) sufficient to strike a glow discharge in every such diode, irrespective of the amount of light entering it. Termination of these pulses before glow discharges are struck in the unilluminated diodes is accomplished by making a low-resistance connection between conductors 128 and 129, in a manner hereinafter explained, to produce a large voltage drop across resistor 131 for effectively terminating the voltage pulses applied to the light-sensitive diodes.

An additional gas-filled diode 132, preferably identical to diodes 121, 122 and 123, is connected in series with a load resistor 133 between conductors 128 and 129. Diode 132 is positioned so that it is illuminated by source 124 without obstruction by card 120. Thus, whereas diodes 121, 122 and 123 may be illuminated or not, selectively, depending upon the information recorded in the form of punched holes in card 120, diode 132 is consistently illuminated and a glow discharge is struck in diode 132 each time that an input pulse is supplied by pulse generator 130. Upon the striking of the glow discharge in diode 132 a pulse of voltage appears across resistor 133.

A thyratron 134 has an anode and a cathode connected to respective ones of conductors 128 and 129, as shown. Thyratron 134 has a control grid connected to the circuit junction between diode 132 and its load resistor 133, so that the striking of a glow discharge in diode 132 supplies a positive voltage between the control grid and cathode of thyratron 134. Thyratron 134 is a type that remains nonconductive until its control grid becomes positive relative to its cathode. (Other types of thyratrons may be used with a negative bias supplied to the control grid by conventional biasing circuits.) Upon becoming conductive, thyratron 134 supplies a low-resistance path between conductors 128 and 129.

Now assume that diodes 122 and 132 are receiving light from light source 124, while diodes 121 and 123 are unilluminated, and that pulse generator 130 supplies a pulse of voltage exceeding the glow-discharge striking voltages of the diodes and having a duration exceeding about 50 microseconds. Within about three microseconds after the beginning of the input pulse supplied by generator 130, glow discharges are struck in the illuminated diodes 122 and 132. Thereupon, positive pulses of voltage appear across resistors 126 and 133.

Responsive to the positive pulse across resistor 133, within a few microseconds a discharge is struck in thyratron 134; and the thyratron becomes conductive and thereupon provides a low-resistance connection between conductors 128 and 129. Consequently, sufficient current flows through thyratron 134 to provide a considerable voltage drop across dropping resistor 131, and the voltage between conductors 128 and 129 falls to a value substantially below the glow discharge striking voltage of the diodes.

Thus, the input pulse applied across the diodes is effectively terminated a few microseconds after the striking of a glow discharge in diode 132. This allows the input pulse to persist just long enough to insure the striking of a glow discharge in each diode that is illuminated by light passing through a punched hole in card 120. Because the pulse length is adjusted automatically by the monitor diode 132, reasonable variations in the amplitude of pulses supplied by generator 130, the intensity of light provided by source 124, the ambient temperature, and other factors that may affect the ionization time of the diodes, are automatically compensated.

For example, if the pulse amplitudes become larger, the ionization time of the diodes become somewhat shorter, diode 132 fires sooner, and the pulse durations are automatically shortened so that the pulses effective across the light-sensitive diodes persist no longer than is necessary to insure the firing of all illuminated diodes. Thus, glow discharges are reliably struck in all illuminated diodes, and in no unilluminated diodes, despite considerable variations that may occur in pulse amplitudes, light source intensities, and other operating conditions.

Whenever a glow discharge is struck in one of the light-sensitive diodes, a substantial pulse of voltage occurs across the resistor connected in series with that diode. Thus, voltage pulses are produced across resistors 125, 126 and 127, selectively, in correspondence with the appearance of punched holes in certain information-storage locations on card 120. Output connections 135, 136 and 137 are provided for transmitting these pulses to any appropriate utilization apparatus.

Figure 9:
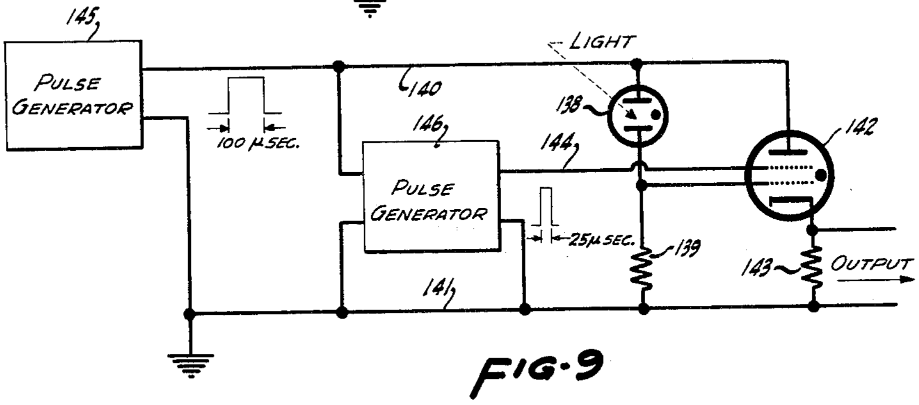
FIG. 9 is a schematic circuit diagram of apparatus utilizing a light-sensitive diode as a delay device.

Referring to FIG. 9, a gas-filled diode 138, which may be a small neon lamp, is connected in a circuit wherein it operates as a light-controlled variable delay device. Diode 138 is connected in series with a load resistor 139 between two conductors 140 and 141. A thyratron 142 has an anode connected to conductor 140 and has a cathode connected to conductor 141 through a load resistor 143. Thyratron 142 is of a type, having two control grids, which becomes conductive only when positive voltages are supplied to both of the two control grids simultaneously. The first control grid of thyratron 142 is connected to the circuit junction between diode 138 and its load resistor 139. The second control grid of thyratron 142 is connected to a conductor 144.

A pulse generator 145 supplied between conductors 140 and 141 pulses of voltage exceeding the glow discharge striking voltage of diode 138. Each such pulse has a duration sufficient to strike a glow discharge in diode 138 even without the presence of externally applied illumination. For example, generator 145 may supply pulses of 100 volts amplitude and 100 microseconds duration. Each pulse supplied by generator 145 strikes a glow discharge in diode 138 and thereupon a pulse of positive voltage appears across resistor 139 and is applied to the first control grid of thyratron 142. However, the time required for each pulse to strike a discharge in diode 138 depends upon whether or not light is entering the diode from an external source.

If diode 138 is strongly illuminated from the outside, a glow discharge is struck in about 3 microseconds, and consequently a pulse appears across resistor 139 and is supplied to the control grid of thyratron 132, within about 3 microseconds after the beginning of each pulse supplied between conductors 140 and 141 by pulse generator 145. On the other hand, if no light is entering diode 138 from outside sources, a much longer time, about 50 microseconds, for example, elapses between the beginning of each pulse supplied by generator 145 and the appearance of a voltage pulse across resistor 139.

A pulse generator 146 is connected to supply between conductors 144 and 141 positive pulses each having a duration longer than the time required to strike a pulse in diode 138 in the presence of adequate light, but shorter than the time required to strike a glow discharge in diode 138 in the absence of light. For example, pulse generator 146 may supply pulses each having a duration of 25 microseconds.

Generator 146 is synchronized to generator 145 by any convenient means so that each pulse supplied by generator 146 begins approximately at the beginning of each pulse supplied by generator 145. This may be accomplished, for example, by making generator 146 a monostable multivibrator, or the like, that is triggered by the beginning of each pulse supplied by generator 145. Thus, pulse generator 146 establishes time intervals, each about 25 microseconds long, starting at the beginning of each pulse supplied by generator 145.

If diode 138 is adequately illuminated by light supplied from any outside source, a glow discharge is struck within the diode about 3 microseconds after the beginning of each pulse supplied by pulse generator 145. Under these circumstances it is evident that positive pulses are supplied to both control grids of thyratron 142 substantially simultaneously—that is, there is a time when both control grids are positive relative to the cathode—and thyratron 142 becomes conductive, whereupon an output pulse is produced across resistor 143.

On the other hand, if no light from outside source is supplied to diode 138, a glow discharge is not struck within the diode until about 50 microseconds after the beginning of the pulse supplied by generator 145. Therefore, no positive pulse is supplied to the first control grid of thyratron 142 until after the end of the positive pulse supplied to the second control grid of the thyratron by pulse generator 146 and at no time are both control grids simultaneously positive relative to the cathode of the thyratron. Under these conditions the thyratron remains non-conductive and no output pulse is produced across resistor 143.

Figure 10:
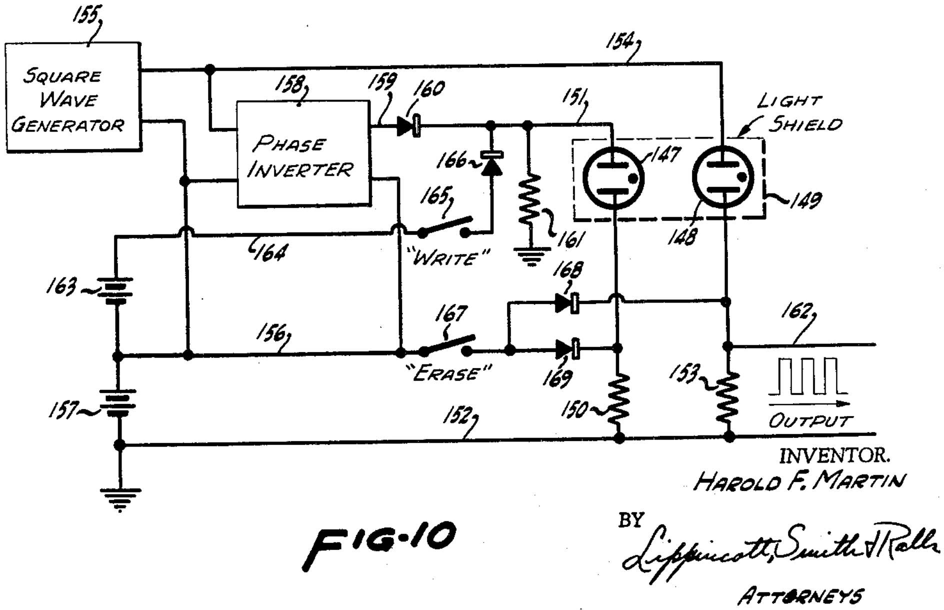
FIG. 10 is a simplified circuit diagram of a binary memory unit incorporating light-sensitive diodes.

Reference is now made to FIG. 10 of the drawings which illustrates a memory unit wherein binary information may be stored. Two gas-filled diodes 147 and 148 may be identical, small neon lamps, such as the well known type NE–2 lamps. Lamps 147 and 148 are placed side-by-side so that a glow discharge in either transmits light into the other. A light shield 149 may be provided to prevent light from reaching either lamp from any other source.

Diode 147 is connected, in series with a load resistor 150, between two conductors 151 and 152. Diode 148 is connected, in series with a load resistor 153, between a conductor 154 and conductor 152, as shown. Conductor 152 may conveniently be circuit ground.

A square-wave generator 155 provides a rectangular waveform voltage of alternately positive and negative polarity between conductor 154 and a conductor 156. For example, this rectangular waveform voltage may have a peak-to-peak amplitude of about 100 volts so the conductor 154 is alternately 50 volts positive and 50 volts negative with respect to conductor 156. Conductor 156 is maintained at a constant potential of 50 volts positive relative to conductor 152 by a voltage supply 157. Consequently, the potential of conductor 154 is alternately zero and 100 volts positive relative to conductor 152, thus providing across diode 148 and resistor 153, in series, a first continuous train of 100 volt positive pulses which exceeds the glow-discharge striking voltage of diode 148. Each such pulse has a duration sufficient to strike a glow discharge in diode 148 when aided by adequate illumination of the diode, but insufficient to strike a glow discharge in diode 148 in the absence of light. For example, each of the pulses may have a duration of about 20 microseconds which is obtained by operating square wave generator 155 at a frequency of approximately 25 kilocycles per second. Thus, diode 148 is operated as a light-sensitive diode according to the principles hereinbefore explained.

A phase inverter 158 reverses the phase (or polarity) of the rectangular waveform voltage supplied by generator 155 and provides between conductors 159 and 156 a rectangular waveform voltage that is identical to the voltage between leads 154 and 156, except for a reversal of polarity. In other words, whenever conductor 154 is 50 volts positive relative to lead 156 conductor 159 is 50 volts negative relative to conductor 156, and vice versa. Thus, the potential of conductor 159 is alternately zero and 100 volts positive relative to conductor 152, thereby providing a second continuous train of 100 volt positive pulses interleaved, with respect to time, between the pulses of the first train, so that the pulses provided between conductors 159 and 152 substantially fill the time intervals between the pulses provided between conductors 154 and 152, and vice versa. Conductor 159 is connected to conductor 151 through a half-wave rectifier 160 so that the 100 volt positive pulses are applied across diode 147 and resistor 150 in series. A resistor 161 preferably is provided between lead 151 and circuit ground for discharging circuit capacitances, including the capacitance between the electrodes of diode 147 during the half-cycles when rectifier 160 is non-conductive.

From the foregoing it is evident that pulses of voltage exceeding the glow discharge striking voltage are applied across diodes 147 and 148 alternately in rapid succession. Because each pulse has a duration insufficient to strike a glow discharge in the diode to which it is applied, unless that diode receives light from some outside source, and since light shield 149 prevents light from reaching either diode from any source except the other diode, the circuit has a stable operating state wherein no glow discharges occur in either diode. Under these conditions most of the voltage drops due to the applied pulses occur across the two non-conductive 147 and 148, and the voltage pulses appearing across load resistors 150 and 153 are negligibly small.

Output connections are provided across resistor 153 by conductors 162 and 152, as shown. The absence of substantial voltage pulses between conductors 162 and 152 indicates that the circuit is in its first or non-conductive operating state, which may represent the absence of a stored bit of information or a binary *zero*.

Various means may be employed to strike a glow discharge in either of the two diodes 147 or 148. For example, another lamp may be placed within light shield 149 so that when this lamp is lit light enters diodes 147 and 148. The voltage pulses supplied to diodes 147 and 148 are of sufficient amplitude and duration to strike glow discharges in the two diodes when the diodes are adequately illuminated. Consequently so long as light enters the two diodes from the auxiliary lamp it is evident that glow discharges will occur in diodes 147 and 148 alternately, as voltage pulses are applied thereto by square wave generator 155 and pulse inverter 158.

Alternatively, a glow discharge may be struck in either diode by applying thereto an additional voltage pulse of sufficient amplitude and duration to strike a glow discharge in the absence of light. As illustrated in the drawing this may comprise a voltage supply 163 for maintaining a conductor 164 at a positive potential of 100 volts relative to conductor 152. A normally open switch 165 and a half-wave rectfier 166 are connected in series between conductor 164 and conductor 151, as shown. Whenever switch 165 is closed it is evident that conductor 151 is maintained at a constant potential of 100 volts positive relative to conductor 152 and that a constant voltage of 100 volts is applied across diode 147 and resistor 150 in series. If switch 165 is kept closed for longer than about 50 microseconds a glow discharge will be struck in diode 147 even though no light is being supplied to this diode. This glow discharge is maintained continuously as long as switch 165 is kept closed. Furthermore, light from the glow discharge in diode 147 illuminates diode 143 and each 100 volt pulse supplied across diode 148 by square-wave generator 155 strikes a glow discharge in diode 148.

Now assume that switch 165 is allowed to open again and that neither diode receives any light except that provided by luminous discharges in the other diode. For example, assume that the instantaneous potential of conductor 151, provided by phase inverter 158, is 100 volts positive relative to conductor 152, that the instantaneous potential of conductor 154 is zero relative to conductor 152, and that a glow discharge exists in diode 147; within a few microseconds the polarities of the voltages provided by square-wave generator 155 and phase inverter 158 are reversed, and the instantaneous potential of conductor 151 becomes zero relative to conductor 152, while the instantaneous potential of conductor 154 becomes 100 volts positive relative to conductor 152.

As the voltage across diode 147 becomes zero the glow discharge therein is extinguished. There is now a voltage of 100 volts across diode 148, which exceeds the glow discharge striking voltage of that diode. Within a few microseconds a glow discharge is struck in diode 148 and thereafter glow discharges are struck in diodes 147 and 148 alternately as voltage pulses are applied thereto by square-wave generator 155. In other words, the two diodes act substantially as though each were continuously illuminated by the other even though the glow discharges therein are extinguished on alternate half-cycles of the applied voltages.

There are various reasons why a glow discharge may be struck quickly within a gas-filled diode that has been illuminated by an immediately preceding discharge in an adjacent diode. For example, each diode may continue to emit light for a very brief period after the voltage across its electrodes falls below the glow-discharge sustaining voltage. Furthermore, electrons extracted from the electrodes of the diode by photoemission may remain in the interelectrode space of the diode for a brief period after the illumination that produced the photoemission is cut off. Also, when a series of glow discharges is struck in rapid succession each diode may not deionize completely between successive discharges. Whatever the explanation, it has been found that the voltage supplied by generator 155 and phase inverter 158 maintains a continuing series of glow discharge occurring in diodes 147 and 148 alternately.

The glow discharge in each diode conducts current which provides a voltage pulse across the load resistor connected to that diode. The successive glow discharges in diode 148 produce across resistor 153, and thus between output conductors 162 and 152, a continuing train of output voltage pulses of about 40 volts amplitude. The presence of these output pulses indicates that the circuit is now operating in its second stable state, which may represent a bit of stored binary information—for example, a binary *one*.

The circuit can be switched back to its first operating state wherein there are no glow discharges in either diode, by any means for interrupting the currents through the two diodes for a period of time sufficient for the two diodes to deionize. For example, square-wave generator 155 may be turned off or disconnected, or any connection in series in the diodes may be broken. Or, means may be provided for reducing the peak voltages supplied to the diodes to values smaller than the glow discharge striking voltage which interrupts the currents by inhibiting the recurrent striking of glow discharges in the two diodes alternately. This may be done, for example, by the circuit means illustrated in FIG. 10, consisting of a normally open switch 157 and two half-wave rectifiers 168 and 169 connected as shown.

It will be noted that switch 157 and rectifier 168 are connected in series between conductor 156 and the lower electrode of diode 148 and that switch 167 and rectifier 159 are connected in series between conductor 156 and the lower electrode of diode 147. Whenever switch 167 is closed the lower electrodes of both diodes are raised to and maintained at a potential of 50 volts positive relative to conductor 152. The potential of conductors 151 and 154, connected to the upper electrodes of the diodes, alternate between zero volts and 100 volts positive relative to conductor 152, as hereinbefore explained. Consequently, with switch 167 closed the upper electrode of each diode is alternately 50 volts positive and 50 volts negative relative to the lower electrode of the same diode and the peak voltage across each diode never exceeds the glow discharge striking voltage. Therefore, the successive striking of glow discharges in the diodes 147 and 148 is interrupted.

In fact, with the arrangement described, the peak voltages across the diodes are lower than the glow discharge sustaining voltages, and the frequent reversals of polarity hasten the deionization of the diode. Hence, with switch 167 held closed long enough for each diode to deionize (for 50 milliseconds for example) the circuit reverts to its first operating state. Thereafter switch 167 may be opened but the circuit will remain in its first operating state wherein there are no glow discharges in either diode, until another glow discharge is initiated by appropriate means such as the closing of switch 165.

It is evident that the circuit illustrated is capable of all functions required of a binary storage unit or memory device. If the existence of glow discharges in the two diodes represents the storage of a bit of binary information or a binary *one*, while the absence of glow discharges represents the absence of a stored bit, or a binary *zero;* then the brief closing of switch 165, as herein explained, stores a binary bit in the memory unit and the brief closing of switch 167 removes such a binary bit from storage. Therefore, switch 165 may be referred to as the "write" input, and switch 167 may be referred to as the "erase" input. Switches 165 and 167 may be operated at will to store either a binary *one* or a binary *zero* in the memory, selectively. The presence or absence of voltage pulses between conductors 162 and 152 provides a continuous read-out of the stored value.

It will be noted that the essential function performed by the closing of switch 165 is to supply a positive voltage pulse through rectifier 166 and conductor 151 and that the essential function performed by the closing of switch 167 is to supply the positive voltage pulse through rectifiers 168 and 169 to the lower electrodes of the two diodes. Therefore, in actual practice switches 165 and 167 can be replaced by any selectively operable means for supplying voltage pulses, including high-speed electronic circuits. It is further evident that numerous variations are possible in the details of the circuit illustrated and described. For example, the "write" pulse may be a negative voltage pulse supplied to the lower electrode of either diode rather than a positive pulse supplied to upper electrode of diode 147 in the manner illustrated. The possibility of using light rather than voltage pulses for switching purposes has already been mentioned.

It is preferred, but not absolutely essential, that the voltages supplied by square-wave generator 155 and phase inverter 158 have essentially rectangular waveforms. Satisfactory operation may be obtained in some instances with waveforms that differ considerably from a rectangular shape, including sine waves. Nor is it essential that voltage supply 157 provide a voltage that is exactly half as large as the peak-to-peak amplitude of the rectangular waveform provided by the square-wave generator.

According to principles hereinbefore disclosed it is not essential that the voltages across the diodes be zero between pulses and in some cases it may be definitely advantageous to apply voltages other than zero, reverse polarity voltages in particular, between the voltage pulses that produce the glow discharges. The phase inverter may be any of various well known electronic circuits for inverting an electric waveform, or it may be a passive circuit such as a transformer. A single square-wave generator and phase inverter may supply a large number of diode pairs, disposed in an array to form a memory matrix of substantial capacity.

It should be understood that this invention in its broader aspects is not limited to specific examples herein illustrated and described. The following claims are intended to cover all changes and modifications within the true spirit and scope of the invention.

What is claimed is:

1. In an electrical gate circuit, the combination of a cold cathode, gas-filled diode, an electric lamp positioned to illuminate said diode, means for applying across said diode pulses of voltage exceeding the glow discharge striking voltage of said diode, each of said pulses having a duration longer than is required to strike a glow discharge in said diode when said diode is illuminated by said lamp but shorter than is required to strike a glow discharge in said diode in the absence of illumination, and an electrical control circuit for selectively lighting and extinguishing said lamp, whereby upon the application of each of said pulses of voltage, said diode conducts or fails to conduct a substantial pulse of current, selectively, under the control of said control circuit.

2. An electrical gate circuit, comprising a cold-cathode, gas-filled diode, a resistor connected in series with said diode, a plurality of electric lamps each positioned to illuminate said diode, a pulse generator connected and operable to supply, across said diode and said resistor in series, sequential pulses of voltage exceeding the striking voltage of said diode, each of said pulses having a duration longer than is required to strike a glow discharge in said diode when said diode is illuminated by any one of said lamps but shorter than is required to strike a glow discharge in said diode in the absence of illumination, and a plurality of electrical control circuits each operable selectively to supply and not to supply electric current to a respective one of said lamps for selectively lighting and extinguishing that lamp, whereby, upon the application of each of said pulses of voltage across said diode and resistor in series, a substantial pulse of voltage appears across said resistor only when any one of said lamps is lit.

3. An electrical gate circuit, comprising a first cold-cathode, gas-filled diode, a first resistor connected in series with said first diode, a first electric lamp positioned to illuminate said first diode, a pulse generator connected and operable to supply, across said first diode and said first resistor in series, sequential pulses of voltage exceeding the striking voltage of said first diode, each of the aforesaid pulses having a duration longer than is required to strike a glow discharge in said first diode when that diode is illuminated by said first lamp but shorter than is required to strike a glow discharge in said first diode in the absence of illumination, a first electrical control circuit operable selectively to supply and not to supply electric current to said first lamp for selectively lighting and extinguishing that lamp, whereby, upon the application of each of said pulses of voltage across said diode and said first resistor in series, a substantial pulse of voltage appears across said first resistor if said first lamp is lit, a second cold-cathode, gas-filled diode, a second resistor connected in series with said second diode, a second electric lamp positioned to illuminate said second diode, coupling means connected and operable to supply, across said second diode and said second resistor in series, only upon the appearance of a substantial pulse of voltage across said first resistor, a pulse of voltage exceeding the striking voltage of said second diode, the last-mentioned pulse having a duration longer than is required to strike a glow discharge in said second diode when that diode is illuminated by said second lamp but shorter than is required to strike a glow discharge in said second diode in the absence of illumination, and a second electrical control circuit operable selectively to supply and not to supply electric current to said second lamp for selectively lighting and extinguishing that lamp, whereby, upon the application of each of said pulses of voltage across said first diode and said first resistor in series, a substantial pulse of voltage appears across said second resistor if both of said first and second lamps are lit.

4. In stored information read-out apparatus, the combination of a plurality of cold-cathode, gas-filled diodes, means for selectively illuminating respective ones of said diodes in accordance with the stored information that is to be read out, means for applying across each of said diodes a pulse of voltage exceeding the glow discharge striking voltage of that diode, each of said pulses having a duration longer than is required to strike a glow discharge in each of the illuminated diodes, whereby, within a time interval shorter than is required to strike a glow discharge in any of the non-illuminated diodes, each of the diodes that is illuminated conducts a pulse of substantial current and each of the diodes that is not illuminated does not conduct a pulse of substantial current, and means responsive to the conduction and lack of conduction of current pulses within said time interval by respective ones of said diodes for providing an electrical output representative of the stored information.

5. In stored information read-out apparatus, the combination of a resistor, a plurality of cold-cathode, gas-filled diodes each connected in series with said resistor, means for selectively illuminating respective ones of said diodes in accordance with the stored information that is to be read out, and means for applying, across said resistor and each of said diodes in sequence, pulses of voltage exceeding the glow discharge striking voltage of each diode, each of said pulses having a duration longer than is required to strike a glow discharge in the illuminated diodes but shorter than is required to strike a glow discharge in the non-illuminated diodes, whereby there appears across said resistor a sequence of voltage pulses that represents the stored information.

6. In stored information read-out apparatus, the combination of a plurality of resistors, a plurality of cold-cathode, gas-filled diodes each connected in series with a respective one of said resistors to form a plurality of diode-and-resistor circuits, connections connecting said diode-and-resistor circuits in parallel, means for selectively illuminating respective ones of said diodes in accordance with the stored information that is to be read out, and means for applying, across each of said diode-and-resistor circuits simultaneously, a pulse of voltage exceeding the glow discharge striking voltage of each diode, said pulse having a duration longer than is required to strike a glow discharge in each illuminated one of said diodes and shorter than is required to strike a glow discharge in any non-illuminated one of said diodes, whereby there appears, across said resistors, a combination of voltage pulses representing the stored information.

7. Apparatus for reading-out information recorded on a record having a plurality of recording areas that send out, when the record is suitably illuminated, much light or little light, selectively, depending upon the information recorded therein, comprising a plurality of cold-cathode, gas-filled diodes, means for positioning the record with respective ones of its recording areas in optical alinement with respective ones of said diodes, means for illuminating said record so that respective ones of said diodes are illuminated or not illuminated, selectively, in accordance with the recorded information, means for applying across each of said diodes a pulse of voltage exceeding the glow discharge striking voltage of that diode, each of said pulses having a duration longer than is required to strike a glow discharge in the diode to which it is applied when that diode is illuminated, whereby, within a time interval shorter than is required to strike a glow discharge in that diode when it is not illuminated, each of the diodes that is illuminated conducts a pulse of substantial current and each of the diodes that is not illuminated does not conduct a pulse of substantial current, and means responsive to the conduction and lack of conduction of current pulses within said time interval by respective ones of said diodes for providing an electrical output representative of the information recorded on said record.

8. Apparatus for reading-out information stored in an information-storage device having a plurality of storage areas that are self-luminous and nonluminous, selectively, depending upon the information stored therein, comprising a plurality of cold-cathode, gas-filled diodes disposed in optical alinement with respective ones of the selectively luminous and nonluminous storage areas of the information storage device, so that respective ones of said diodes are illuminated and not illuminated, selectively, in accordance with the stored information, means for applying across each of said diodes a pulse of voltage exceeding the striking voltage of that diode, each of said pulses having a duration longer than is required to strike a glow discharge in the diode to which it is applied when that diode is illuminated, whereby, within a time interval shorter than is required to strike a glow discharge in that diode when it is not illuminated, each of the diodes that is illuminated conducts a pulse of substantial current and each of the diodes that is not illuminated does not conduct a pulse of substantial current, and means responsive to the conduction and lack of conduction of current pulses within said time interval by respective ones of said diodes for providing an electrical output representative of the information stored in said device.

9. In a light-detection circuit, the combination of first and second gas-filled diodes that light can enter, a light source means to illuminate said first diode by light that is to be detected, means for supplying other light into said second diode, means for supplying across said first and second diodes, simultaneously, voltage pulses exceeding the glow discharge striking voltages of said diodes, and means controlled by the striking of a glow discharge in said second diode for terminating said pulse across said first diode, so that a glow discharge is struck in said first diode if it receives sufficient light, but not otherwise.

10. A light-responsive electrical circuit, comprising first and second electrical conductors, a first gas-filled diode and a first impedor connected in series between said first and second conductors, a second gas-filled diode and a second impedor connected in series between said first and second conductors, a light source disposed to transmit light into both of said first and second diodes through separate light paths, means for selectively blocking and unblocking the path between said source and said first diode without blocking the path between said source and said second diode, means for supplying between said first and said second conductors a pulse of sufficient voltage to strike a glow discharge in said second diode, whereupon a voltage pulse appears across said second impedor, a thyratron having an anode and a cathode connected to respective ones of said first and second conductors, said thyratron having a control grid so connected that the thyratron is normally nonconductive but becomes conductive upon the appearance of said voltage pulse across said second impedor, whereupon said thyratron provides a low-resistance connection that effectively terminates said voltage pulse between said first and second conductors, whereby a glow discharge is struck in said first diode and a voltage pulse appears across said first impedor if said path between said light source and first diode is unblocked, but not if said path is blocked.

11. A memory device, comprising two gas-filled diodes in which luminous glow discharges can occur, said diodes being so disposed that a luminous discharge in either diode supplies light into the other diode, means for supplying across said diodes alternately, in rapid succession, pulses of voltage exceeding the glow discharge striking voltage of that diode, each of said pulses having a duration sufficient to strike a glow discharge in the diode to which it is applied if that diode has received light from an immediately preceding glow discharge in the other diode, but insufficient to strike such a discharge in the absence of light, whereby said pulses will maintain a continuing series of glow discharges within alternate ones of said diodes but will not initiate such a series unaided, and other means for iniating a glow discharge in one of said diodes.

12. A memory device comprising two glow discharge lamps disposed side-by-side so that a glow discharge in either supplies light into the other, means for applying a substantially continuous train of voltage pulses across one of said lamps, means for applying another substantially continuous train of voltage pulses across the other of said lamps, the pulses of said two trains being interleaved with respect to time so that the pulses of each train substantially fill the time intervals between pulses of the other train, each of said pulses exceeding the glow discharge striking voltage of the lamp to which it is applied for a time sufficient to strike a glow discharge in that lamp if it has received light from an immediately preceding glow discharge in the other lamp, but insufficient to strike such a discharge in the absence of light, whereby said pulses will maintain a continuing series of glow discharges within alternate ones of said lamps, but will not initiate such a series unaided, so that a two-state circuit is provided which has a first stable state wherein no glow discharges occur in said two lamps and a second stable state wherein glow discharges occur in said two lamps alternately, means for applying at will across one of said lamps a voltage pulse of sufficient amplitude and duration to strike a glow discharge in that lamp in the absence of light, whereby the circuit is switched at will from said first stable state to said second stable state, and means for interrupting at will the current through said lamps for a sufficient time to deionize the lamps, whereby the circuit is switched at will from said second stable state to said first stable state.

References Cited by the Examiner

UNITED STATES PATENTS

| | | | |
|---|---|---|---|
| 2,573,373 | 10/51 | Wales | 351—151 X |
| 2,727,683 | 12/55 | Allen et al. | 235—61 |
| 2,743,430 | 4/56 | Schultz et al. | 340—173 |
| 2,790,088 | 4/57 | Shive | 250—211 |
| 2,977,505 | 3/61 | Smith | 314—84 |

RALPH G. NILSON, *Primary Examiner.*

RICHARD M. WOOD, WALTER STOLWEIN, *Examiners.*